United States Patent
Villasante et al.

(10) Patent No.: US 12,237,985 B2
(45) Date of Patent: Feb. 25, 2025

(54) TECHNIQUE FOR DYNAMICALLY CLASSIFYING AND RE-CLASSIFYING A DATA PACKET FLOW

(71) Applicant: Telefonaktiebolaget LM Ericsson (PUBL), Stockholm (SE)

(72) Inventors: Carlota Villasante, Madrid (ES); Miguel Angel Muñoz De La Torre Alonso, Madrid (ES); Ruth Pallares Del Egido, Madrid (ES); Miguel Angel Julian Aguilar, Madrid (ES); Marc Molla, Madrid (ES); Rodrigo Alvarez Dominguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 17/775,183

(22) PCT Filed: Dec. 18, 2019

(86) PCT No.: PCT/EP2019/085980
§ 371 (c)(1),
(2) Date: May 6, 2022

(87) PCT Pub. No.: WO2021/093982
PCT Pub. Date: May 20, 2021

(65) Prior Publication Data
US 2022/0385550 A1    Dec. 1, 2022

(30) Foreign Application Priority Data

Nov. 11, 2019   (EP) .................................. 19382989

(51) Int. Cl.
*H04L 47/2441*    (2022.01)
*H04L 41/5019*    (2022.01)
(Continued)

(52) U.S. Cl.
CPC ........ *H04L 43/026* (2013.01); *H04L 41/5019* (2013.01); *H04L 47/2441* (2013.01); *H04L 47/2483* (2013.01)

(58) Field of Classification Search
CPC ....................................... H04L 47/24
See application file for complete search history.

(56) References Cited

U.S. PATENT DOCUMENTS

| 8,843,598 B2 | 9/2014 | Singhal et al. |
| 10,044,619 B1 * | 8/2018 | Tönsing ................. H04L 45/76 |

(Continued)

OTHER PUBLICATIONS

3GPP TS 29.244 v16.0.0; 3rd Generation Partnership Project; Technical Specification Group Core Network and Terminals; Interface between the Control Plane and the User Plane Nodes; Stage 3 (Release 16)—Jun. 2019.

(Continued)

*Primary Examiner* — Benjamin Lamont
(74) *Attorney, Agent, or Firm* — Sonoda & Kobayashi Intellectual Property Law; Sarvajit S. Patil

(57) ABSTRACT

A technique for dynamically classifying and re-classifying a data packet flow on a user plane of a core network domain is described. According to an apparatus aspect, a device is provided for dynamically classifying and re-classifying a data packet flow, wherein the device is configured to classify and re-classify the data packet flow using packet detection rules (PDRs) and wherein each PDR is associated with at least one action to be applied to data packets matching the PDR. The device is configured to receive one or more first data packets of a data packet flow, to determine that the received one or more first data packets match a first PDR to classify the data packet flow according to the first PDR, and to trigger application of at least one first action associated with the first PDR to the one or more first packets. The device is further configured to receive one or more second (Continued)

data packets of the data packet flow, wherein the one or more second data packets are received after the one or more first data packets, to determine that the received one or more second data packets match a second PDR to re-classify the data packet flow according to the second PDR, wherein the second PDR is different from the first PDR, and to trigger application of at least one second action associated with the second PDR to the one or more second data packets.

19 Claims, 13 Drawing Sheets

(51) Int. Cl.
*H04L 43/026* (2022.01)
*H04L 47/2483* (2022.01)

(56) References Cited

U.S. PATENT DOCUMENTS

| | | |
|---|---|---|
| 2002/0055998 A1 | 5/2002 | Riddle et al. |
| 2017/0099228 A1* | 4/2017 | Hunsperger ........ H04L 47/2483 |
| 2018/0262599 A1* | 9/2018 | Firestone ............ H04L 47/2441 |
| 2020/0267077 A1* | 8/2020 | Williams ............ H04L 47/2441 |
| 2020/0267085 A1* | 8/2020 | Nie ..................... H04L 47/2425 |
| 2021/0289390 A1* | 9/2021 | Zhou ................. H04W 28/0933 |
| 2022/0109962 A1* | 4/2022 | Zhu ......................... H04W 4/06 |
| 2022/0200813 A1* | 6/2022 | Thiebaut ................. H04W 4/24 |

OTHER PUBLICATIONS

PCT International Search Report issued for International application No. PCT/EP2019/085980—Mar. 20, 2020.
PCT Written Opinion of the International Searching Authority issued for International application No. PCT/EP2019/085980—Mar. 20, 2020.

* cited by examiner

| Feature Octet / Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation / release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.x). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | RECU | Sxb, Sxc | Reclassification handling is supported by the UP function. |

| Octet 1 and 2 | | Create PDR IE Type = 1(decimal) | | | | |
|---|---|---|---|---|---|---|
| Octets 3 and 4 | | Length = n | | | | |
| Information elements | P | Condition / Comment | Appl. | | | IE Type |
| | | | Sx a | Sx b | Sx c | N4 |
| PDR ID | M | This IE shall uniquely identify the PDR among all the PDRs configured for that PFCP session. | X | X | X | X | PDR ID |
| Precedence | M | This IE shall indicate the PDR's precedence to be applied by the UP function among all PDRs of the PFCP session, when looking for a PDR matching an incoming packet. | - | X | X | X | Precedence |
| PDI | M | This IE shall contain the PDI against which incoming packets will be matched. See Table 7.5.2.2-2. | X | X | X | X | PDI |
| Outer Header Removal | C | This IE shall be present if the UP function is required to remove one or more outer header(s) from the packets matching this PDR. | X | X | - | X | Outer Header Removal |
| FAR ID | C | This IE shall be present if the Activate Predefined Rules IE is not included or if it is included but it does not result in activating a predefined FAR. When present this IE shall contain the FAR ID to be associated to the PDR. | X | X | X | X | FAR ID |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X | URR ID |
| QER ID | C | This IE shall be present if a QoS enforcement action shall be applied to packets matching this PDR. When present, this IE shall contain the QER IDs to be associated to the PDR. Several IEs within the same IE type may be present to represent a list of QERs to be associated to the PDR. | - | X | X | X | QER ID |
| Activate Predefined Rules | C | This IE shall be present if Predefined Rule(s) shall be activated for this PDR. When present this IE shall contain one Predefined Rules name. Several IEs with the same IE type may be present to represent multiple "Activate Predefined Rules" names. | - | X | X | X | Activate Predefined Rules |
| Reclassification | O | This IE shall be present if Reclassification handling is enabled for this PDR | - | x | x | x | Reclassification |

| Octet 1 and 2 | | Update PDR IE Type = 9 (decimal) | | | | |
|---|---|---|---|---|---|---|
| Octets 3 and 4 | | Length = n | | | | |
| Information elements | P | Condition / Comment | Appl. | | | IE Type |
| | | | Sx a | Sx b | Sx c | N4 |
| PDR ID | M | This IE shall uniquely identify the PDR among all the PDRs configured for that PFCP session. | X | X | X | X | PDR ID |
| Outer Header Removal | C | This IE shall be present if it needs to be changed. | X | X | - | X | Outer Header Removal |
| Precedence | C | This IE shall be present if there is a change in the PDR's precedence to be applied by the UP function among all PDRs of the PFCP session, when looking for a PDR matching an incoming packet. | - | X | X | X | Precedence |
| PDI | C | This IE shall be present if there is a change within the PDI against which incoming packets will be matched. When present, this IE shall replace the PDI previously stored in the UP function for this PDR. See Table 7.5.2.2-2. | X | X | X | X | PDI |
| FAR ID | C | This IE shall be present if it needs to be changed | X | X | X | X | FAR ID |
| URR ID | C | This IE shall be present if a measurement action shall be applied or no longer applied to packets matching this PDR.<br>When present, this IE shall contain the list of all the URR IDs to be associated to the PDR. | X | X | X | X | URR ID |
| QER ID | C | This IE shall be present if a QoS enforcement action shall be applied or no longer applied to packets matching this PDR.<br>When present, this IE shall contain the list of all the QER IDs to be associated to the PDR. | - | X | X | X | QER ID |
| Activate Predefined Rules | C | This IE shall be present if new Predefined Rule(s) needs to be activated for the PDR. When present this IE shall contain one Predefined Rules name.<br>Several IEs with the same IE type may be present to represent multiple "Activate Predefined Rules" names. | - | X | X | X | Activate Predefined Rules |
| Deactivate Predefined Rules | C | This IE shall be present if Predefined Rule(s) needs to be deactivated for the PDR. When present this IE shall contain one Predefined Rules name.<br>Several IEs with the same IE type may be present to represent multiple "Activate Predefined Rules" names. | - | X | X | X | Deactivate Predefined Rules |
| Reclassification | O | This IE shall be present if Reclassification handling is enabled for this PDR. | - | x | x | x | Reclassification |

Fig. 7C

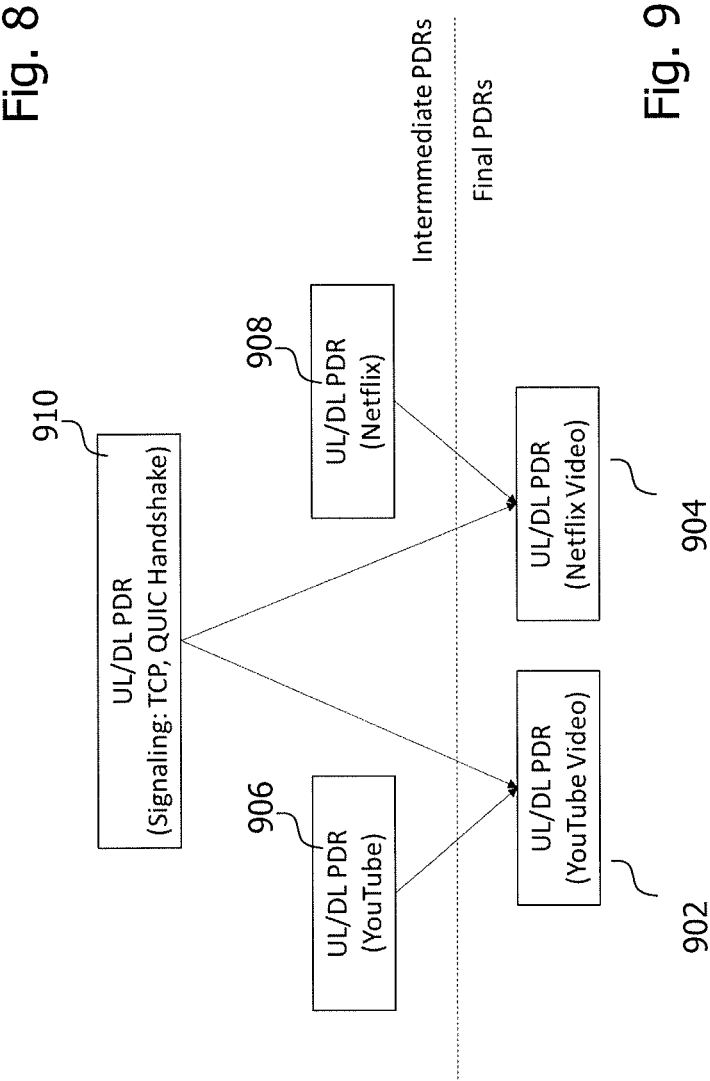

TECHNIQUE FOR DYNAMICALLY CLASSIFYING AND RE-CLASSIFYING A DATA PACKET FLOW

PRIORITY

This nonprovisional application is a U.S. National Stage Filing under 35 U.S.C. § 371 of International Patent Application Serial No. PCT/EP2019/085980 filed Dec. 18, 2019 and entitled "TECHNIQUE FOR DYNAMICALLY CLASSIFYING AND RE-CLASSIFYING A DATA PACKET FLOW" which claims priority to European Patent Application No. 19 382 989.2 filed Nov. 11, 2019 both of which are hereby incorporated by reference in their entirety.

TECHNICAL FIELD

The present disclosure generally relates to traffic classification on a user plane of a core network domain. In more detail, the disclosure relates to performing and controlling a dynamic classification and re-classification of a data packet flow using packet detection rules. The technique can be implemented as a device, as a method, as a system and as computer program product.

BACKGROUND

Certain wireless communication networks have an access network domain and a core network domain. The access network domain comprises network nodes such as base stations that provide wireless network access to terminal devices (e.g., smartphones, tablet computers and Internet of Things (IoT) devices). The core network domain, among other things, connects the terminal devices served by the access network domain to other networks. Such other networks include content provider networks that deliver, often via the Internet, application services. Typical application services include instant messaging (IM), video streaming (e.g., Netflix® or YouTube®) or audio streaming (e.g., Spotify® or Deezer®).

The core network domain of modern wireless communication networks is split in a control plane on the one hand and a user plane on the other. This splitting is also denoted control plane user plane separation (CUPS). Control signaling within and across the core network domain takes place on the control plane, whereas application traffic is transported on the control plane.

Application traffic includes dedicated sequences of data packets that are logically grouped into individual data packet flows. Proper classification of individual data packet flows is an important user plane feature. Such flow classification is needed for various control and reporting purposes, including traffic steering, enforcement of Quality of Service (QoS) guarantees, traffic measurements and traffic reporting. Since the user plane classification process is controlled by and reports to control plane entities, an interface and an associated communication protocol is required between these two planes.

An exemplary communication protocol between the user plane and the control plane of $5^{th}$ generation (5G) communication networks is defined by the $3^{rd}$ Generation Partnership Project (3GPP) in its technical specification (TS) 29.244, V16.1.0 (2019-09) "LTE; Interface between the Control Plane and the User Plane of EPC Nodes". This communication protocol is also referred to as the Packet Forwarding Control Protocol (PFCP).

PFCP defines a packet forwarding model that includes a procedure to classify data packet flows using packet detection rules (PDRs). Each PDR contains packet detection information (PDI) in the form of one or more match fields against which incoming data packets are matched on the user plane. Moreover, each PDR is associated with one or more actions (e.g., forwarding, duplicating, buffering, dropping, measuring) that are to be applied to the matching data packets.

One consideration underlying the classification of data packet flows is an identification of the application service generating the data packets. Such a classification may be desirable for traffic steering or charging purposes. However, the first data packets in a data packet flow typically do not carry sufficient information to permit a reliable determination of the particular application service having generated these data packets. Moreover, to reliably identify a particular application service such as Facetime® video streaming, it is typically required to analyze at least around 100 data packets in a certain flow due to heuristics-based analyzation techniques. As such, it is difficult (and often dependent on the particular application service used) to reliably determine the point in time when, and the number of, data packets to be analyzed in order to reliably classify a data packet flow.

In an effort to increase classification reliability, one may, for example, wait for a predetermined number of data packets after which to start the data packet analysis and additionally increase the number of data packets that are analyzed. However, this solution may lead to an unnecessary delay in properly classifying a particular data packet flow since different application services may have different characteristics.

SUMMARY

There is a need for a technique that provides an efficient technique for proper classification of a data packet flow on a user plane of a core network domain.

According to a first aspect, a device is provided for dynamically classifying and re-classifying a data packet flow on a user plane of a core network domain, wherein the device is configured to classify and re-classify the data packet flow using packet detection rules (PDRs) and wherein each PDR is associated with at least one action to be applied to data packets matching the PDR. The device is configured to receive one or more first data packets of a data packet flow, to determine that the received one or more first data packets match a first PDR to classify the data packet flow according to the first PDR, and to trigger application of at least one first action associated with the first PDR to the one or more first packets. The device is further configured to receive one or more second data packets of the data packet flow, wherein the one or more second data packets are received after the one or more first data packets, to determine that the received one or more second data packets match a second PDR to re-classify the data packet flow according to the second PDR, wherein the second PDR is different from the first PDR, and to trigger application of at least one second action associated with the second PDR to the one or more second data packets.

The first action and the second action may be the same action or different actions. Such actions may include data packet forwarding, duplicating, dropping or buffering. Such actions may also include applying measurements to the data packets (e.g., volume measurements) or applying QoS enforcement actions.

The first data packets may immediately precede the second data packets. In other variants, third data packets are received between the first data packets and the second data packets.

In one variant, the data packet flow has been established for transmitting application data via the core network domain. The application data may have been generated by an application service. In such a case, the one or more first data packets may be received in a transitory phase (e.g., during session establishment and thus preceding transmission of the application data). Moreover, the one or more second data packets may contain the application data, such as the data of actual interest to a user (e.g., video or audio data). In some variants, also the first data packets contain the data of actual interest, but cannot yet be classified as such (e.g., because a heuristics engine used for determining an application identity associated with the second PDR requires more data packets, such as the one or more second data packets, for proper determination).

The application service may have software components running on an application server, running on a terminal device (e.g., a smartphone or IoT device) or running both on an application server and a terminal device. The application service may be provided in the form of an over-the-top (OTT) application.

The device of the first aspect may be configured to send a re-classification indication which indicates that the packet data flow has been re-classified. This indication may enable proper core network processing (e.g., reporting or charging) based on the re-classification, rather than on any earlier (e.g., initial) classification.

Moreover, the device of the first aspect may be configured to receive, in response to the re-classification indication, a reporting request. In some cases, the reporting request relates to at least one measurement pertaining to the one or more first data packets. Alternatively, or in addition, the reporting request relates to at least one measurement pertaining to the one or more second data packets. The measurement may in particular relate to a data volume of one or more data packets or to a number of data packets.

The device of the first aspect may be configured to transmit a measurement report that reports at least one measurement pertaining to both the one or more first data packets and the one or more second data packets. As such, reporting of the measurement(s) performed for the one or more first packets may be delayed at least until the re-classification has taken place. In some variants, the measurement(s) pertaining to both the one or more first data packets and the one or more second data packets are accumulated before reporting (e.g., so that a single measurement value is reported pertaining to both the one or more first data packets and the one or more second data packets).

The device of the first aspect may be configured to receive a first instruction selectively enabling usage of the second PDR for re-classification purposes. The device of the first aspect may be configured to also receive another instruction selectively enabling usage of the first or any other PDR for re-classification purposes. In some cases, the device of the first aspect is configured to apply one or more PDRs for which re-classification has not been enabled, or dedicatedly disabled. As such, the device of the first aspect may be configured to receive a second instruction selectively disabling usage of the second PDR for re-classification purposes. The device of the first aspect may be configured to also receive another instruction selectively disabling usage of the first or any other PDR for re-classification purposes.

The first and second instructions may be received with a temporal offset. For example, the first instruction selectively enabling usage of the second PDR for re-classification purposes may be received prior to the second instruction disabling usage of the second PDR for re-classification purposes. The second PDR may dedicatedly be marked to be usable only for re-classification purposes.

The first instruction and the second instruction may be signaled to the device of the first aspect in various ways. For example, the first instruction and the second instruction may be encoded in a particular bit that is either set or not set. When, for example set, the bit may signal the first instruction and, when not set, the second instruction (or vice versa).

The device of the first aspect may be configured to receive a third instruction selectively disabling reporting of at least one measurement performed for the one or more first data packets matching the first PDR at least until it is determined that the second PDR is matched by the one or more second data packets. The third instruction may be signaled in various ways. For example, the third instruction may be encoded in a particular bit that is either set or not set. When, for example, set, the bit may signal the third instruction and, when not set, no instruction or any other instruction (or vice versa). The third instruction may be indicative of the second PDR.

The device of the first aspect may be configured to receive a fourth instruction selectively enabling reporting of at least one measurement performed for the one or more first data packets. The fourth instruction may be tied to the first instruction, meaning that both instructions are signaled in combination. As an example, setting (or not setting) a particular bit may signal both the first instruction and the fourth instruction. Both instructions could, of course, also be signaled independently from each other. The fourth instruction and the third instruction may be received with a temporal offset.

The device of the first aspect may be configured to receive a measurement instruction defining how the at least one measurement for the one or more first data packets is to be at least one of performed and reported. The measurement instruction may be received together with (e.g., encoded in) the first PDR. The device of the first aspect may also be configured to receive (e.g., together with the second PDR) a measurement instruction defining how the at least one measurement for the one or more second data packets is to be at least one of performed and reported.

The device of the first aspect may be configured to unconditionally perform and report the at least one measurement for the one or more first data packets in accordance with the measurement instruction as long as the reporting is enabled.

The device of the first aspect may be configured to receive the measurement instruction in a first message pertaining to one of creation and modification of the first PDR at the device. The device of the first aspect may be configured to receive one or more of the instructions (e.g., the first, second, third or fourth instruction and/or the measurement instruction) in a second message pertaining to one of creation and modification of the second PDR at the device.

The device of the first aspect may be configured to receive a notification associating the first PDR with the second PDR. The notification may be received together with the third instruction in the second message. The notification may be received in the second or a third message pertaining to one of creation and modification of the second PDR at the device.

The device of the first aspect may be configured to send a capability report indicative of the device being capable of performing data packet flow re-classification. The capability report may trigger another device to transmit the second PDR to the device of the first aspect.

According to a second aspect, a device is provided for controlling dynamic classification and re-classification of a data packet flow on a user plane of a core network domain based on PDRs, wherein each PDR is associated with at least one action to be applied to data packets matching the PDR. The device of the second aspect is configured to transmit a first PDR to enable classification of a data packet flow according to the first PDR, wherein the first PDR is associated with at least one first action that is to be applied to one or more first packets matching the first PDR. The device of the second aspect is further configured to transmit a second PDR to enable re-classification of the classified data packet flow according to the second PDR, wherein the second PDR is different from the first PDR and associated with at least one second action that is to be applied to one or more second packets matching the second PDR, wherein the one or more second data packets follow the one or more first data packets.

The device according to the second aspect may be located on a control plane of the core network domain (e.g., in a CUPS implementation). In such a case, it may communicate with the user plane device of the first aspect using at least one of a dedicated communication protocol and dedicated communication interface.

The first action may be signaled together with the first PDR to the device of the first aspect. In a similar manner, possibly with a temporal offset, the second action may be signaled together with the second PDR to the device of the first aspect.

The data packet flow may have been established for transmitting application data via the communication network. In such a scenario, the one or more first data packets may be generated in a transitory phase (e.g., during session establishment and thus preceding generation of the application data). Additionally, or in the alternative, the one or more second data packets may contain the application data.

The device of the second aspect may be configured to receive a re-classification indication indicating that the packet data flow has been re-classified. It may then transmit, in response to the re-classification indication, a reporting request, wherein the reporting request relates to at least one measurement pertaining to at least one of the one or more first data packets and the one or more second data packets.

The device of the second aspect may be configured to receive a measurement report that reports at least one measurement pertaining to both the one or more first data packets and the one or more second data packets. The device of the second aspect may be configured to send a first instruction selectively enabling usage of the second PDR for re-classification purposes. Additionally, or in the alternative, it may be configured to send a second instruction selectively disabling usage of the second PDR for re-classification purposes. The device of the second aspect may be configured to send a third instruction selectively disabling reporting of at least one measurement performed for the one or more first data packets matching the first PDR at least until it is determined that the second PDR is matched by the one or more second data packets. Alternatively, or in addition, the device of the second aspect may be configured to send a fourth instruction selectively enabling reporting of at least one measurement performed for the one or more first data packets. Details in regard to these instructions have been discussed above with reference to the device of the first aspect.

The device of the second aspect may be configured to send a measurement instruction defining how the at least one measurement for the one or more first data packets are to be at least one of performed and reported. The measurement instruction may be sent in a first message pertaining to one of creation and modification of the first PDR at the device. The device of the second aspect may be configured to send at least one of the instructions (e.g., the first, second, third or fourth instruction and/or the measurement instruction) in a second message pertaining to one of creation and modification of the second PDR at the device.

The device of the second aspect may be configured to send a notification associating the first PDR with the second PDR. The notification may be sent together with the third instruction in the second message. Alternatively, or in addition, the notification may be sent in the second or a third message pertaining to one of creation and modification of the second PDR at the device.

The device of the second aspect may be configured to receive a capability report indicative of a recipient of the second PDR (i.e., the device of the first aspect) being capable of performing data packet flow re-classification. The capability report may trigger transmission of the second PDR to the device of the first aspect. The second PDR may dedicatedly be marked to be usable for re-classification purposes only.

Also provided is a flow classification system comprising the device of the first aspect and the device of the second aspect.

According to a first method aspect, a method of dynamically classifying and re-classifying a data packet flow on a user plane of a core network domain using PDRs is provided, wherein each PDR is associated with at least one action to be applied to data packets matching the PDR. The method comprises receiving one or more first data packets of a data packet flow, determining that the received one or more first data packets match a first PDR to classify the data packet flow according to the first PDR, and triggering application of at least one first action associated with the first PDR to the one or more first packets. The method further comprises receiving one or more second data packets of the data packet flow, wherein the one or more second data packets are received after the one or more first data packets, determining that the received one or more second data packets match a second PDR to re-classify the data packet flow according to the second PDR, wherein the second PDR is different from the first PDR, and triggering application of at least one second action associated with the second PDR to the one or more second data packets.

The first method aspect may be performed by the device of the first aspect.

According to a second method aspect, a method of controlling dynamic classification and re-classification of a data packet flow on a user plane of a core network domain based on PDRs is provided, wherein each PDR is associated with at least one action to be applied to data packets matching the PDR. The method comprises transmitting a first PDR to enable classification of a data packet flow according to the first PDR, wherein the first PDR is associated with at least one first action that is to be applied to one or more first packets matching the first PDR. The method further comprises transmitting a second PDR to enable re-classification of the classified data packet flow according to the second PDR, wherein the second PDR is different from the first PDR and associated with at least one second action that is to be applied to one or more second packets matching the second PDR, wherein the one or more second data packets follow the one or more first data packets.

The second method aspect may be performed by the device of the second aspect.

Also provided is a computer program product comprising program code portions to perform the steps of any of the method aspects when the computer program product is executed by one or more processors. The computer program product may be stored on a computer readable recording medium.

BRIEF DESCRIPTION OF THE DRAWINGS

Further aspects, details and advantages of the present disclosure will become apparent from the detailed description of exemplary embodiments below and from the drawings, wherein:

FIGS. 7A-C are tables illustrating information elements for packet data flow re-classification in a PFCP embodiment;

FIG. 8 illustrates the content of an information element for packet data flow re-classification in a PFCP embodiment; and FIG. 9 is a diagram illustrating a hierarchical mapping among intermediate and final PDRs.

DETAILED DESCRIPTION

Figure 1:
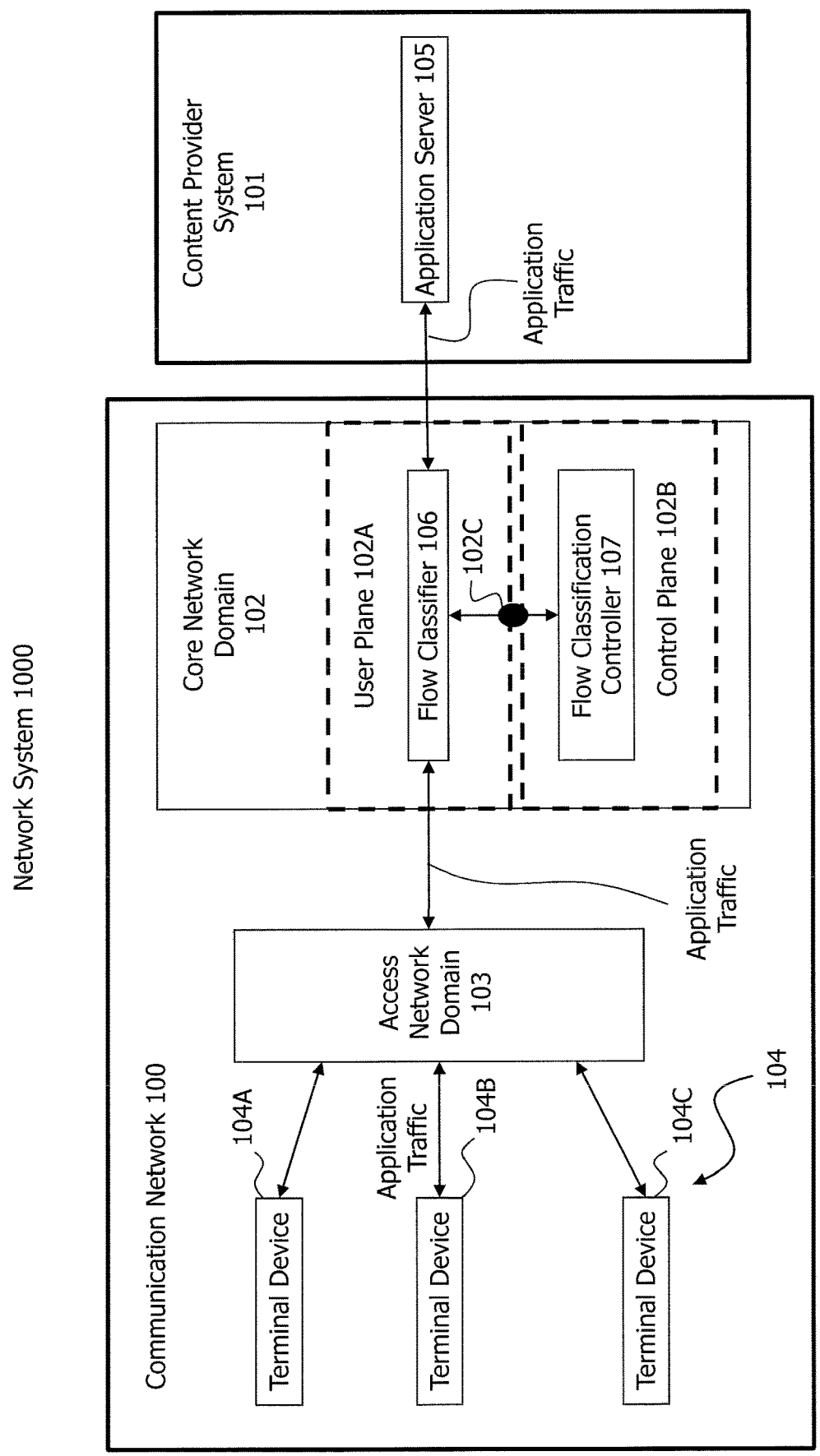
FIG. 1 is a diagram illustrating a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, some embodiments of the following description focus on an exemplary core network configuration in accordance with 5G specifications, the present disclosure is not limited in this regard. The present disclosure could also be implemented in other cellular or non-cellular wireless communication networks having a core network domain, such as those complying with 4G specifications.

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a network system 1000 in which the present disclosure can be implemented. As shown in FIG. 1, the network system 1000 comprises a wireless communication network 100 operated by a network operator. The wireless communication network 100 may be a mobile (e.g., a cellular) communication network. The network system 1000 further comprises a content provider system 101 operated by a content provider (sometimes also called service provider). The content provider system 101 provides an application service (such as an instant messaging, IM, service or a video or audio streaming service).

As shown in FIG. 1, the communication system 100 comprises a core network domain 102 and a wireless access network domain 103. Each of these domains 102, 103 comprises a user plane for transporting application traffic and a control plane for transporting control signaling. In FIG. 1, the user plane 102A and the control plane 102B are only illustrated for the core network domain 102.

Different wireless terminal devices 104, such as a user equipment- (UE-) type terminal device 104A (e.g., a smartphone) and two IoT-type terminal devices 104B, 104C (e.g., a car and a wearable device), are serviced by the core network domain 102 via, e.g., an access point or a base station (not shown) of the access network domain 103. The terminal devices 104A, 104B and 104C are collectively denoted by reference numeral 104.

The services provided by the core network domain 102 include transporting application traffic in the form of data packet flows between the content provider system 101 and the terminal devices 104. Application traffic transported by the core network domain 102 will primarily be generated by an application server 105 in the content provider system 101. It will be appreciated that any of the terminal devices 104 could likewise generate application traffic (e.g., when sending IM messages or when up-loading video or audio data).

In some variants, the application server 105 is configured to provide an over-the-top (OTT) application service (e.g., YouTube, Netflix, Spotify or Deezer). Such an OTT application service typically generates OTT application traffic in the form of video data or audio data (normally in a session context). The OTT application traffic can take the form of one or more OTT data packet flows.

The core network domain 102 comprises multiple logical network entities. In FIG. 1, primarily the network entities participating in application traffic handling and control are illustrated. Those network entities comprise a flow classification device 106 (also called flow classifier hereinafter) on the user plane 102A and a flow classification controlling device 107 (also called flow classification controller hereinafter) on the control plane 102B. A communication interface 102C and an associated communication protocol are defined between the flow classification controller 107 and the flow classifier 106. Each of the flow classification controller 107 and the flow classifier 106 may have a separate instance of that interface 102C.

The flow classifier 106 is configured to classify a particular packet data flow and, optionally, re-classify that data packet flow one or multiple times during its lifetime. Classification and re-classification are performed by the flow classifier 106 using packet detection rules (PDRs). A particular data packet flow is classified (or re-classified) according to a particular PDR in case one or more data packets of that data packet flow match that particular PDR. To this end, each PDR contains one or more match fields or other packet detection information against which a particular data packet analysed by the flow classifier 106 is matched. The packet detection information is, for example, matched against information carried in a data packet header. Additionally, or in the alternative, the packet detection information is, for example, matched against information carried in a data packet body (using, e.g., a deep packet inspection technique).

Each PDR is further associated with at least one action to be applied to the one or more data packets matching a particular PDR. Such an action may, for example, relate to one or more of forwarding, duplicating, dropping or buffering a matching data packet. In addition, or as an alternative, such an action may relate to a measurement that is to be applied to a matching data packet (e.g., pertaining to a data packet size, also referred to as data packet volume). In such a case, a further action associated with the PDR may be indicative of how the measurement, or a set of measurements, is to be reported (e.g., to the flow classification controller 107 via communication interface 102C). As a further alternative, or further additionally, an action may relate to an enforcement of a QoS strategy for the one or more matching data packets.

A particular action may be applied to the one or more matching data packets by the flow classifier 106 itself. In such a case, determination by the flow classifier 106 that a particular data packet matches a particular PDR may trigger application of the associated action by the flow controller 106. Alternatively, or in addition, the flow classifier 106 may trigger another component of the core network domain 102 or the access network domain 103 to apply a particular action to the one or more matching data packets.

The flow classification controller 107 is configured to enable classification and re-classification of data packet flows by the flow classifier 106. To this end, the flow classification controller 107 is configured to transmit PDRs (and associated information such as actions to be applied to matching data packets) via the communication interface 102C to the flow classifier 106. The flow classifier 106, on the other hand, is configured to report via the communication interface 102C measurements or other actions performed in accordance with the PDRs to the flow classification controller 107. In some variants, the flow classifier reports data packet flow re-classification events to the flow classification controller 107.

In the following, apparatus embodiments of the flow classification controller 107 and the flow classifier 106 will be described with reference to FIGS. 2A and 2B as well as 3A and 3B, respectively. Also, operations of the apparatus embodiments will be described with reference to corresponding method embodiments illustrated in flow diagrams 400, 410 of FIGS. 4A and 4B, respectively.

Figure 2B:
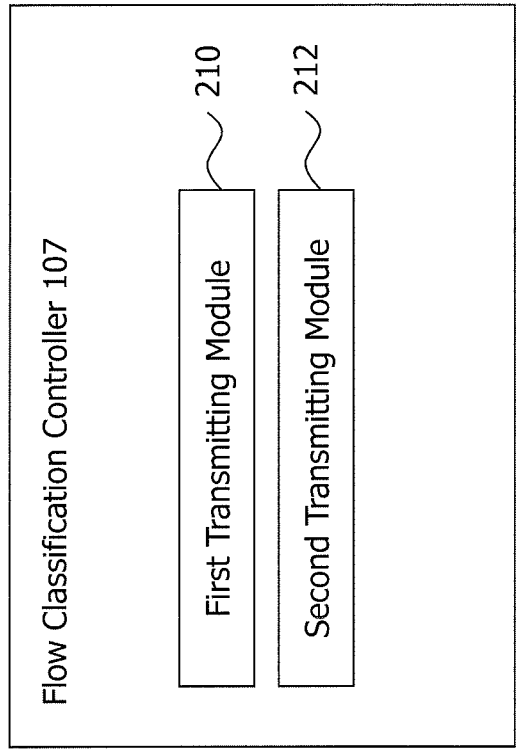
FIGS. 2A, 2B are block diagrams illustrating apparatus embodiments of two flow classification controllers in accordance with the present disclosure.
Figure 2A:
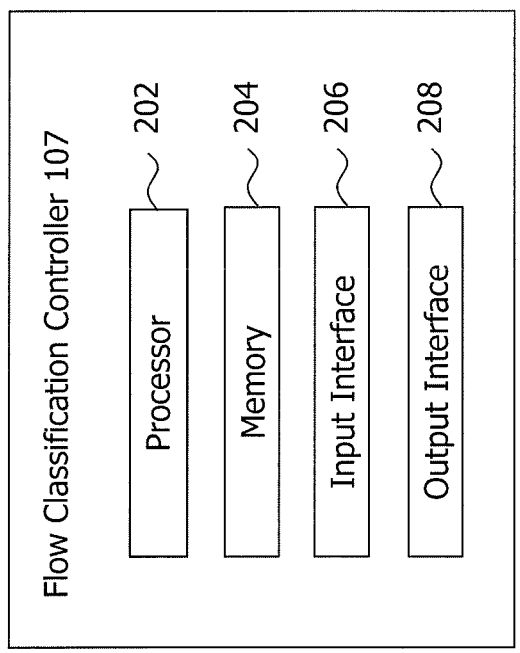

FIGS. 2A and 2B illustrate two embodiments of the flow classification controller 107 of FIG. 1. In the embodiment illustrated in FIG. 2A, the flow classification controller 107 comprises a processor 202 and a memory 204 coupled to the processor 202. The memory 204 stores program code that controls operation of the processor 202. The flow classification controller 107 further comprises an input interface 206 and an output interface 208. The two interfaces 206, 208 may be instances of the communication interface 102C illustrated in FIG. 1.

As understood herein, a processor, such as processor 202, may be implemented using any processing circuitry and is not limited to, for example, a single processing core but may also have a distributed topology.

The processor 202 of the flow classification controller 107 is configured to control dynamic classification and re-classification of a data packet flow on the user plane 102A by the flow classifier 106. To this end, the processor 202 transmits, in step 402 of FIG. 4A, via output interface 208, a first PDR to the flow classifier 106 to enable classification of a data packet flow by the flow classifier 106 according to the first PDR. As mentioned above, the first PDR is associated with at least one first action that is to be applied by the flow classifier 106 to one or more first packets matching the first PDR. The first action may be signaled, together with the first PDR, to the flow classifier 107 (e.g., in a single message).

The first action may, for example, be a simple forwarding of the one or more first data packets. Alternatively, the first action may be a dropping of the one or more first data packets (e.g., to meet QoS guarantees for other packet data flows in a congestion situation).

Figure 4A:
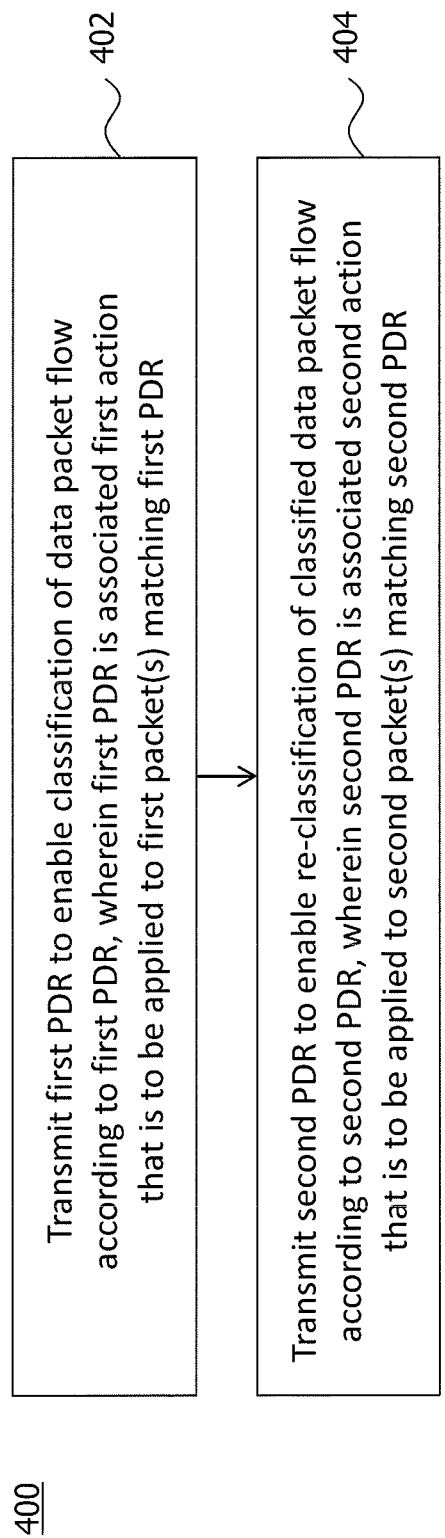
FIGS. 4A, 4B illustrate flow diagrams of two method embodiments of the present disclosure.

The processor 202 in step 404 of FIG. 4A transmits, via output interface 208, a second PDR to the flow classifier 106 to enable re-classification of the classified data packet flow by the flow classifier 106 according to the second PDR. Steps 402 and 404 can be performed in any order and also in parallel (e.g., using a single message).

The second PDR is different from the first PDR and associated with at least one second action that is to be applied by the flow classifier 106 to one or more second packets matching the second PDR. The one or more second data packets, to which the second action will be applied, follow the one or more first data packets in the data packet flow. The second action may be signaled, together with the second PDR, to the flow classifier 107 (e.g., in a single message). The second action may be of the same action type (e.g., duplicate) as the first action or of a different action type.

FIG. 2B shows an embodiment in which the flow classification controller 107 is implemented in a modular and optionally distributed configuration (e.g., using a computing cloud). As shown in FIG. 2B, the flow classification controller 107 then comprises a first transmitting module 210 configured carry out step 402 and a second transmitting module 210 configured to carry out step 404 of flow diagram 400 as illustrated in FIG. 4A.

Figure 3B:
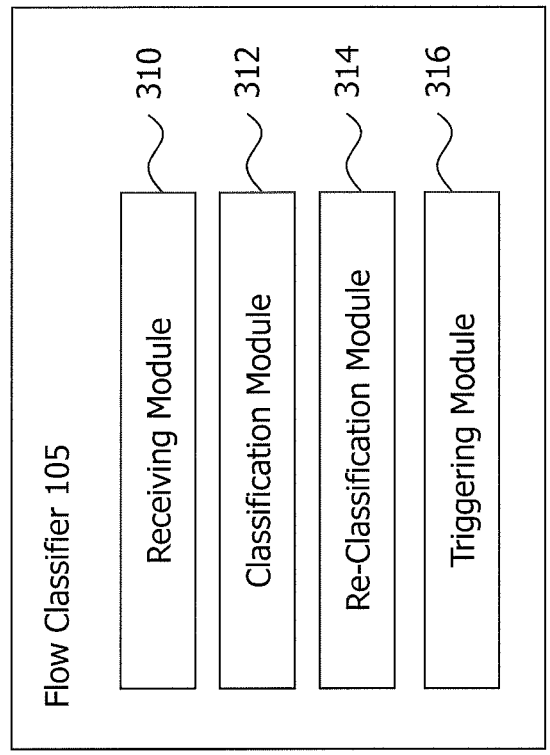
FIGS. 3A, 3B are block diagrams illustrating apparatus embodiments of two flow classifiers in accordance with the present disclosure.
Figure 3A:
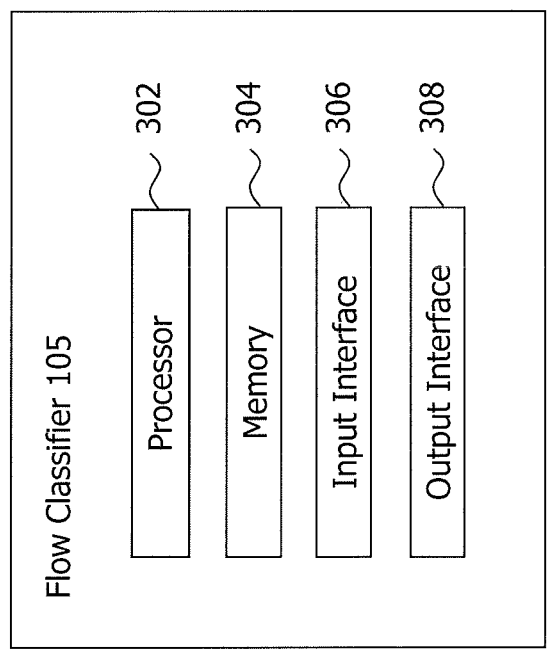

FIGS. 3A and 3B illustrate two embodiments of the flow classifier 106 of FIG. 1. In the embodiment illustrated in FIG. 3A, the flow classifier 106 comprises a processor 302 and a memory 304 coupled to the processor 302. The memory 304 stores program code that controls operation of the processor 302. The flow classifier 106 further comprises an input interface 306 and an output interface 308. The two interfaces 306, 308 may form part of the communication interface 102C illustrated in FIG. 1.

Figure 4B:
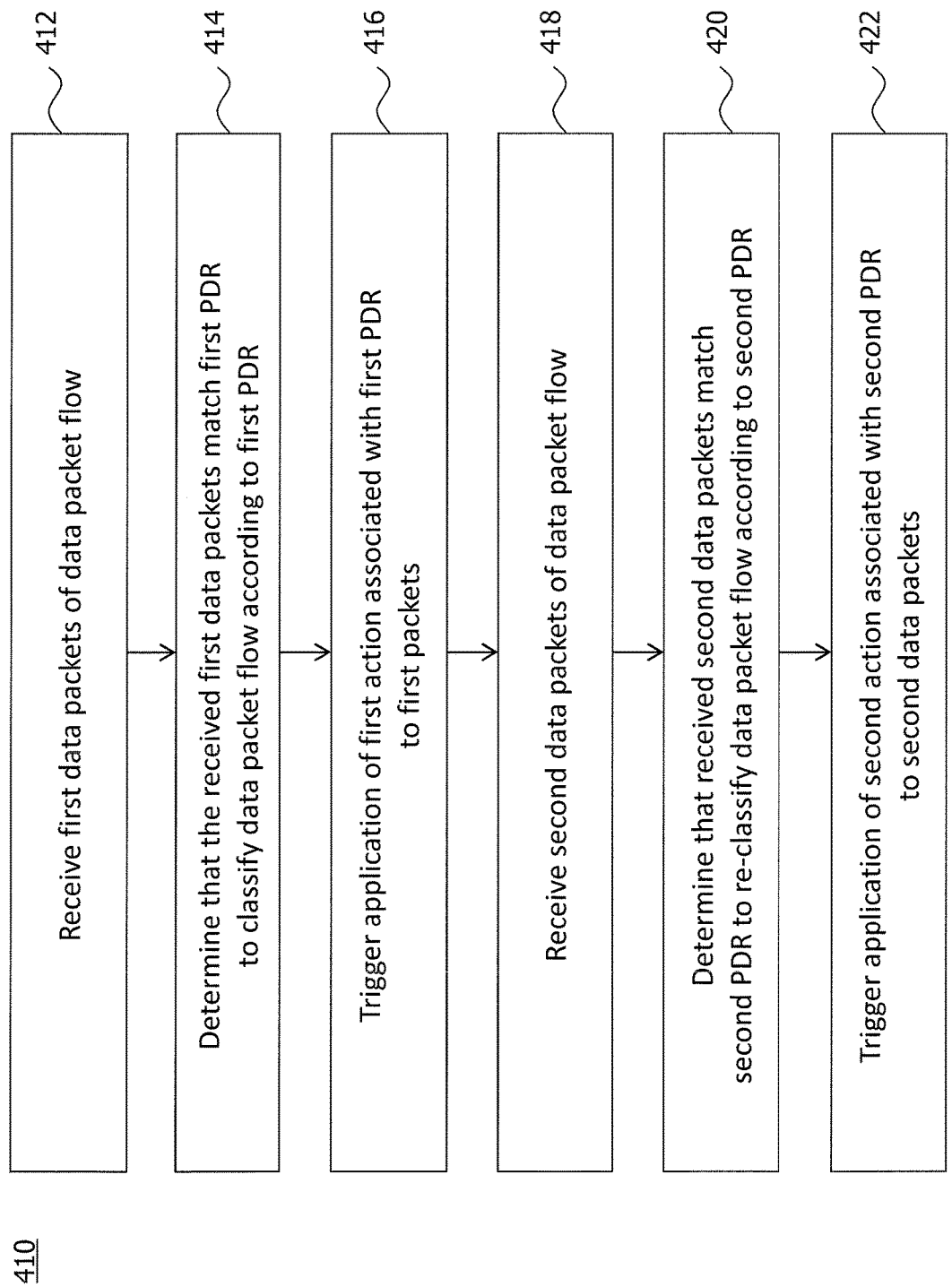

The processor 302 of the flow classifier 106 is configured to receive, in step 412 of FIG. 4B, one or more first data packets of a data packet flow. These first packets may be received from any of the terminal devices 104 or the application server 105. The data packet flow has been established for transmitting application data via the core network domain 102. The one or more first data packets are received in a transitory packet transmission phase preceding transmission of the actual application data. This could mean, in the exemplary case of the packet data flow being established for a video streaming application, that the one or more first data packets do not yet contain any video data but information relating, for example, to a transport layer control protocol that is to be used for video data transmission.

The processor 302 of the flow classifier 106 is further configured to determine, in step 414, that the received one or more first data packets match the first PDR. As explained with reference to FIG. 4A, the first PDR has been transmitted by the flow classification controller 107 to the flow classifier 106 to enable the flow classifier 106 to classify the data packet flow according to the first PDR. The first PDR is associated with the at least one first action signaled by the flow classification controller 107 to the flow classifier 106 together with the first PDR. In some implementations, the processor 302 transmits to the flow classification controller 107 a classification notification indicative of the data packet flow having been classified to match the first PDR.

In step 416, the processor 302 triggers application of the at least one first action associated with the first PDR to the one or more first packets of the data packet flow.

While the data packet flow is being transmitted further, the processor 302 receives in step 418 one or more second data packets of the data packet flow previously classified in step 414. As such, the one or more second data packets are received after the one or more first data packets. The one or more second packets may contain the application data (e.g., video data) transmitted after the transitory packet transmission phase.

Then, in step 420, the processor 302 determines that the received one or more second data packets match the second PDR (that is different from the first PDR). As such, the processor 302 now re-classifies the data packet flow according to the second PDR ("re-classification event"). Moreover, in step 422, the processor 302 triggers application of the at least one second action associated with the second PDR to the one or more second data packets.

In some implementations, the processor 302 transmits to the flow classification controller 107a re-classification notification indicative of the data packet flow now having been re-classified to match the second PDR. The flow classification controller 107 may respond to the re-classification notification with a reporting request to trigger a measurement report from the flow classifier 106. This measurement report may be the first measurement for the data packet flow and may be indicative of the data volume of the one or more first data packets received until the re-classification event. In some cases, measurement report is also indicative of the data volume of the one or more second data packets received after the re-classification event.

The above general embodiments will now be described in greater detail with reference to 3GPP TS for 4G and 5G communication systems. 3GPP TS 23.501 V16.2.0 (2019-09), for example, defines architectural aspects of a service-based architecture (SBA). According to this SBA, network functions (NF) use service-based interactions to consume services from other NFs. The discovery of services and of NFs producing them is provided by a network repository function (NRF). Service producing NFs register, update or deregister their profiles in the NRF. Service consuming NFs discover services offered by NF producer instances by querying the NRF about NF instances offering services of a given type. NFs may subscribe and unsubscribe to changes in the status of NFs registered in the NRF. Based on such subscriptions, the NRF will notify NFs of status changes of other NFs.

FIG. 6 depicts a portion of the 5G reference architecture as defined by 3GPP (see, e.g., Section 4.2.3 of 3GPP TS 23.501 V16.2.0). Particular core network entities (NFs) and core network interfaces of interest for some embodiments are now discussed in more detail.

A user equipment (UE) 104 constitutes an exemplary terminal device 104 (see FIG. 1). UE 104 can, for example, be configured as an endpoint of a video or audio streaming session that stretches via an access network domain 103, such as a (radio) access network, (R)AN.

An application function (AF) 105 can be located outside the core network domain 102. AF 105 is configured to interact with the core network domain 102 via an Naf interface. In the following embodiments, AF 105 takes the role of the application server 105 of FIG. 1 (e.g., in a video or audio streaming session with UE 104).

A network exposure function (NEF) 108 has an Nnef interface and supports different functionality. AF 105 outside of the core network domain 102 interacts with the core network domain 102 through NEF 108.

A session management function (SMF) 107 is a control plane function with an Nsmf interface. In the following embodiments, SMF 107 receives policy and charging control (PCC) rules from a policy control function (PCF) 108 and configures a user plane function (UPF) 106 accordingly. The PCC rules include PDRs and associated actions. Among other things, SMF 107 controls the packet processing in UPF 106 by establishing, modifying or deleting PFCP Sessions and by provisioning (i.e., adding, modifying or deleting) PDRs and associated actions, as defined in forwarding action rules (FARs), QoS enforcement rules (QERs) and/or usage reporting rules (URRs), per PFCP session. A PFCP session may correspond to an individual PDU session or a standalone PFCP session not tied to any PDU session. In the context of the following embodiments, the SMF 107 takes the role of the flow classification controller 107 of FIG. 1.

UPF 106 has an N4 interface 102C (see FIG. 1) to SMF 107 and an N3 interface to the access network domain (here: a radio access network, RAN) 103. UPF 106 supports classification and re-classification of application traffic based on the PDRs received from SMF 107. UPF 106 takes the role of the flow classifier 106 of FIG. 1

The policy control function (PCF) 110 supports, via an Npcf interface, a unified policy framework to govern the core network domain behavior. Specifically, in the following embodiments, PCF 110 provides the PCC rules to the 107 that enforces PCC decisions according to these PCC rules.

A unified data repository (UDR) 112 centrally stores data in the core network domain 102, and an access and mobility management function (AMF) 114 handles access and mobility for UE 104.

The following embodiments are based on an extension of the N4 interface 102C and the associated communication protocol, i.e., PCFP as defined in 3GPP TS 29.244 V16.1.0 (2019-09). Such an extension is required because 3GPP TS 29.244 has certain deficiencies. That is, when traffic usage reporting is enabled, data packets matching a certain PDR are reported according to the corresponding URR, but in case data packets of a certain data packet flow match different PDRs during the lifetime of that data packet flow, there is no mechanism for proper handling that situation (e.g., one or more of traffic volume reporting, QoS enforcement and charging might be incorrect). This problem happens quite frequently as a particular application service cannot usually be identified with the analysis of the first data packet(s) of a data packet flow. Some currently problematic scenarios are now described in more detail.

To properly identify video, audio or IM components in a certain application service such as Facetime, it is required to analyze a significant amount of user plane data packets. For example, to detect Facetime video it is required to analyze around 100 data packets in a certain data packet flow. Another example is detection of IoT application services which requires detection of behavioral patterns and, as such, necessitates analysis of a significant number of data packets. In general, traffic detection might include some type of heuristic analysis. However, heuristic analysis is not guaranteed to be 100% accurate, and this limitation is inherent in every heuristic approach that needs a large number of data packets to identify an application service.

Moreover, the very first (e.g., internet protocol, IP) data packet in a certain data packet flow usually does not carry enough information to identify the application service for which the data packet flow has been established with the required accuracy. For example, for application services based on the transport control protocol (TCP) transport, the first packet is a TCP SYN packet which only includes the IP address (and port) of the destination server, and that address (and port) might refer to a content delivery network (CDN) server hosting multiple application services. In case of IP fragmentation or TCP segmentation it is even worse, as the IP fragment does not even include the basic information mentioned above (because it needs to be reassembled first).

The above scenarios imply that during the lifetime of a certain data packet flow, the classification approach currently defined in 3GPP TS 29.244 may inconsistently classify data packets, and the data packet flow as such, into one of different PDRs. This will now be explained in more detail with reference to an exemplary data packet flow established for YouTube video application services.

Data packets 1 to 2 (e.g., quick UDP Internet connections, QUIC, handshake: QUIC Client Hello and QUIC Server Hello) of the data packet flow may be classified according to a given PDR (UL or DL) to match QUIC traffic (or according to another PDR to match default traffic).

Data packets 3 to 99 of the data packet flow may be classified according to a given PDR (UL or DL) to match YouTube traffic (i.e., the data packets are identified as pertaining to a YouTube application service, but it is still unknown which subtype of traffic it is, e.g., video, browsing, etc.).

Data packets 100 until the end of the data packet flow classified in accordance with a given PDR (UL or DL) to match YouTube video traffic (i.e., traffic analysis has resulted in identifying that the traffic is YouTube video).

In the above example, the whole data packet flow (from data packet 1 to the end of the data packet flow) should properly be classified as a YouTube video flow, and it should be reported (and charged) by the network operator as such. However, in the classification approach currently defined in 3GPP TS 29.244 the data packet flow may improperly be classified to match QUIC traffic or YouTube traffic in general, without any later re-classification because in certain implementations (and mainly to save central processing unit, CPU, resources), once application traffic for a certain data packet flow (as defined by its 5-tuple) matches a certain PDR, the subsequent data packets in that flow are usually classified directly in that PDR, without further analysis.

The above problems are avoided in the data packet flow re-classification embodiments generally described with reference to FIGS. 1 to 4B above and now described in a particular 4G/5G context with reference to the network system 1000 of FIG. 5 and signaling diagrams FIGS. 6A to 6C.

Figure 6A:
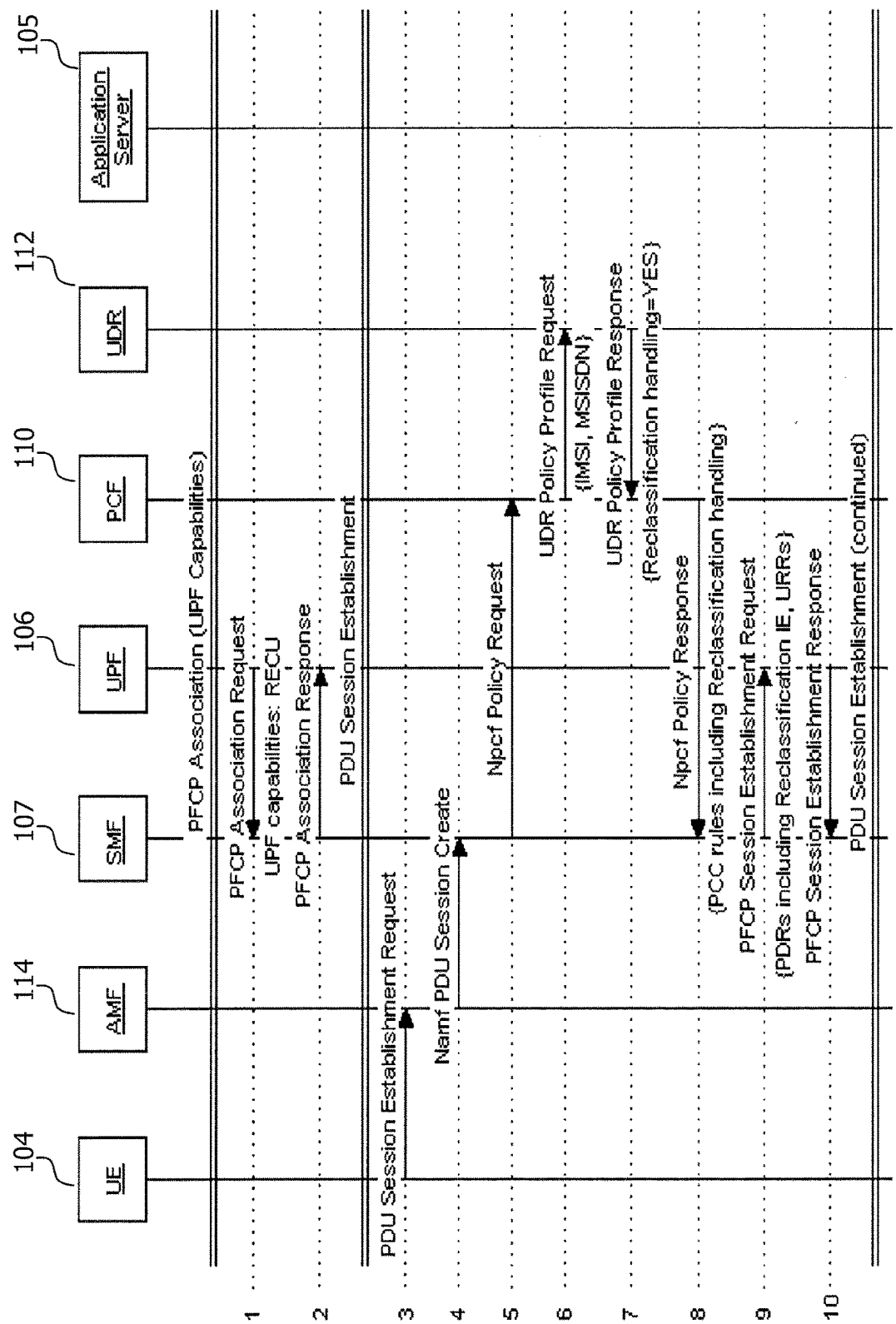
FIGS. 6A-C are schematic diagram signaling diagrams illustrating further embodiments of the present disclosure in the context of the 5G network architecture of FIG. 5.

In signaling step 1) of FIG. 6A, an initial PCFP association procedure between UPF 106 and SMF 107 is started in which UPF 106 reports its general capabilities to SMF 107 in a PCFP association request message. In the present embodiment, UPF 106 will report that it is, among other things, capable of re-classifying packet data flows (also called re-classification handling capability, or RECU, hereinafter). Additionally, the re-classification handling functionality will be activated in UPF 106 in this phase. If the functionality is not active, UPF 106 will not perform any action in relation with this functionality. The PCFP association request message will be answered in step 2) by a PCFP association response message from SMF 107.

RECU reporting indicates to SMF 107 that the reporting UPF 106 is capable of not only classifying a data packet flow a single time, but also of re-classifying it based on corresponding re-classification instructions from SMF 107. There may exist other UPFs in the network system 1000 not capable of re-classifying packet data flows. Accordingly, if SMF 107 intends to implement QoS enforcement, charging or any other procedures using data packet flow re-classification, it may select any particular UPF 106 supporting the re-classification handling capability. RECU reporting thus can influence UPF selection by SMF 107.

RECU reporting can be performed by UPF 106 in the so-called UP Function Features IE that indicates to SMF 107 the features supported by the UP function, i.e., UPF 106. These features are listed in Table 8.2.25-1 of 3GPP TS 29.244, and FIG. 7A illustrates how this table can be extended for RECU signaling. The suggested extension is shown in the last line in the table of FIG. 7A, and it will be appreciated that the signaling extension could also be accommodated in another octet or bit.

UE 104 may at any time trigger a protocol data unit, PDU, Session Establishment procedure, see steps 3) to 10) in FIG. 6A. This procedure will be triggered independently from the PCFP association procedure between UPF 106 and SMF 107. As part of this procedure, at step 7), PCF 110 retrieves from UDR 112 a subscriber profile for UE 104. In the present case, this subscriber profile indicates, among other things, that the re-classification handling functionality is to be enabled for this particular subscriber and, thus, UE 104 (but possibly not for others also served by UPF 106).

In step 8), PCF 110 installs in SMF 107 a set of PCC rules for different application services (e.g. YouTube video, YouTube, QUIC handshake, etc.). As part of each PCC rule, a new parameter indicates if data packet flow re-classification handling is to be enabled on a per application basis. In this example, PCF 110 will enable re-classification handling for YouTube video traffic.

Since the PCC rules received by SMF 107 in step 8) for UE 104 indicate that data packet flow re-classification handling is to be enabled, SMF 107 selects a particular UPF 106 that previously reported its re-classification handling capability (see steps 1) and 2) in FIG. 6A). In subsequent steps 9) and 10), SMF 107 triggers a PFCP Session Establishment procedure towards the selected UPF 106 to indicate the PDRs and the associated actions for matching data packets, such as FARs, URRs, QERs, etc. for the PDU session that is to be established. Step 9) in FIG. 6A corresponds to steps 402 and 404.

Each PDR contains packet detection information (PDI) specifying the traffic filters or signatures against which incoming data packets are matched. Each PDR is associated is with the following rules defining actions to apply to packets matching the PDI:

one FAR indicating one or more actions related to the processing of the matching data packets (e.g., forward, duplicate, drop or buffer the packet each matching data packet with or without notifying SMF 107 about data packet arrival);

zero, one or more QERs indicating one or more actions related to QoS enforcement; and zero, one or more URRs indicating one or more actions related to traffic measurement and reporting.

In step 9), SMF 107 indicates to UPF 106 which PDRs have the re-classification handling functionality enabled (e.g., PDRs relating to a particular application service detected through a heuristics engine), by supplementing PFCP with a new IE called Reclassification IE hereinafter. Specifically, it is proposed to extend the Create PDR IE within a PFCP Session Establishment Request message as illustrated in the table of FIG. 7B. In more detail, the supplemented Reclassification IE is shown in the last line of this table. The table illustrated in FIG. 7B is based on table 7.5.2.2-1 of 3GPP TS 29.244.

It is to be noted that the Update PDR IE within a PFCP Session Modification Request message may be extended in a similar manner as the PFCP Session Establishment Request message, see the last line of the table of FIG. 7C. The table of FIG. 7C is based on table 7.5.4.2-1 of 3GPP TS 29.244. During an ongoing PDU session, SMF 107 may thus enable (or disable) the re-classification handling functionality for any of the PDRs active for that session using the Reclassification IE in the PFCP Session Modification Request message. The Reclassification IE can be included in uplink PDRs, downlink PDRs or both.

The new Reclassification IE in the PFCP Session Modification Request message or the PFCP Session Establishment Request message may have a format as illustrated in FIG. 8. Of particular interest in FIG. 8 are the first bit and the second bit of octet 5 of the Reclassification IE as well as octets 6 to 7 of that IE.

The first and second bits of octet 5 are used to signal instructions to UPF 106 as to if and how the PDR associated with the corresponding Reclassification IE is to be applied for data packet flow re-classification.

If Bit 1 (denoted Reclassification Final, or simply RECF) is set to "1", then re-classification handling is selectively enabled for this PDR. Moreover, this PDR is considered as final, which means that if this PDR is matched by data packets, reporting of traffic measurements in regard to the matching data packets is enabled. The traffic reporting details as such may be defined by the URR associated with the PDR.

If Bit 1 (RECF) is set to "0", then re-classification handling is selectively disabled for this PDR.

If Bit 2 (denoted Reclassification Intermediate, or simply RECI) is set to "1", then re-classification handling is selectively enabled for this PDR. Moreover, this PDR is considered as intermediate, which means that if this PDR is matched, in an intermediate phase traffic reporting should not be triggered either until the corresponding final PDR (as indicated in octets 6 and 7) is matched or until the flow or session are finished.

If Bit 2 (RECI) is set to "0", then re-classification handling (i.e., the intermediate phase) is selectively disabled for this PDR.

Octets 6 to 7 (denoted PDR ID) are only present when RECI bit is set. These octets identify the (final) PDR identifier detection of which shall trigger traffic reporting. If PDR ID is set to 0 it means any PDR which has the corresponding RECF bit set.

An example showing how different PDRs can be hierarchically interrelated by mapping via the Reclassification IEs is illustrated in FIG. 9. In this example, SMF 107 will include the Reclassification IE in the following PDRs that are signaled together with the associated actions (i.e., one or more FERs, zero one or more QERs and zero one or more URRs) in the PCCs to UPF 106:

One or more PDRs (uplink and downlink) 902 corresponding to YouTube video traffic data packets. In this Reclassification IE, the RECF bit will be set to 1.

One or more PDRs (uplink and downlink) 904 corresponding Netflix video traffic. In this Reclassification IE, the RECF bit will be set to 1.

One or more PDRs (uplink and downlink) 906 corresponding generally to data packets of the YouTube application service. In this Reclassification IE, the RECI bit will be set to 1. PDR 906 is linked with PDR 902 by specifying an identifier of PDR 902 in octets 6 and 7 of the Reclassification IE for PDR 906.

One or more PDRs (uplink and downlink) 908 corresponding generally to data packets of the Netflix application service. In this Reclassification IE, the RECI bit will be set to 1. PDR 908 is linked with PDR 904 by specifying an identifier of PDR 904 in octets 6 and 7 of the Reclassification IE for PDR 908.

One or more PDRs (uplink and downlink) 910 corresponding to data packets of a QUIC handshake procedure (QUIC Client Hello and QUIC Server Hello). In this Reclassification IE, the RECI bit will be set to 1. PDR 910 is linked with both PDR 902 and PDR 904 by specifying identifiers of PDR 902 and 904 in octets 6 and 7 of the Reclassification IE for PDR 910.

In the example of FIG. 9, there may exist further PDRs (not shown) for other application services, such as Instagram®, but those are not associated with a Reclassification IE. This lack of association with a Reclassification IE is equivalent to the RECF bit and the RECI bit of those PDRs being both set to 0.

It will also be appreciated that the PDR hierarchy may not just include two levels, as shown in FIG. 9, but also three or more levels. In an implementation with three levels, for example, PDR A with RECI bit set to 1 may point to PDR B, PDR B with RECI bit set to 1 may point to PDR C, and PDR C may have RECF bit set to 1. Any multi-level PDR hierarchy may dynamically be changed by adding or removing hierarchy levels. In the exemplary three-level hierarchy, for example, SMF 107 may disable PDR B to reduce the PDR hierarchy to two levels only. To this end, SMF 107 may use the Update PDR IE (see FIG. 7C) to have PDR A with RECI bit set to 1 point to PDR C, RECI bit of PDR B set to 0 may, PDR C remain unchanged (i.e., RECF bit will still be set to 1).

Based on the exemplary PDR hierarchy illustrated in FIG. 9, or another PDR hierarchy for other application service scenarios, application traffic can properly be classified initially and re-classified later on. Also, traffic reporting can efficiently be controlled. These aspects will now be explained with reference to the signaling diagram of FIG. 6B for the exemplary application service of YouTube video application services.

Figure 6B:
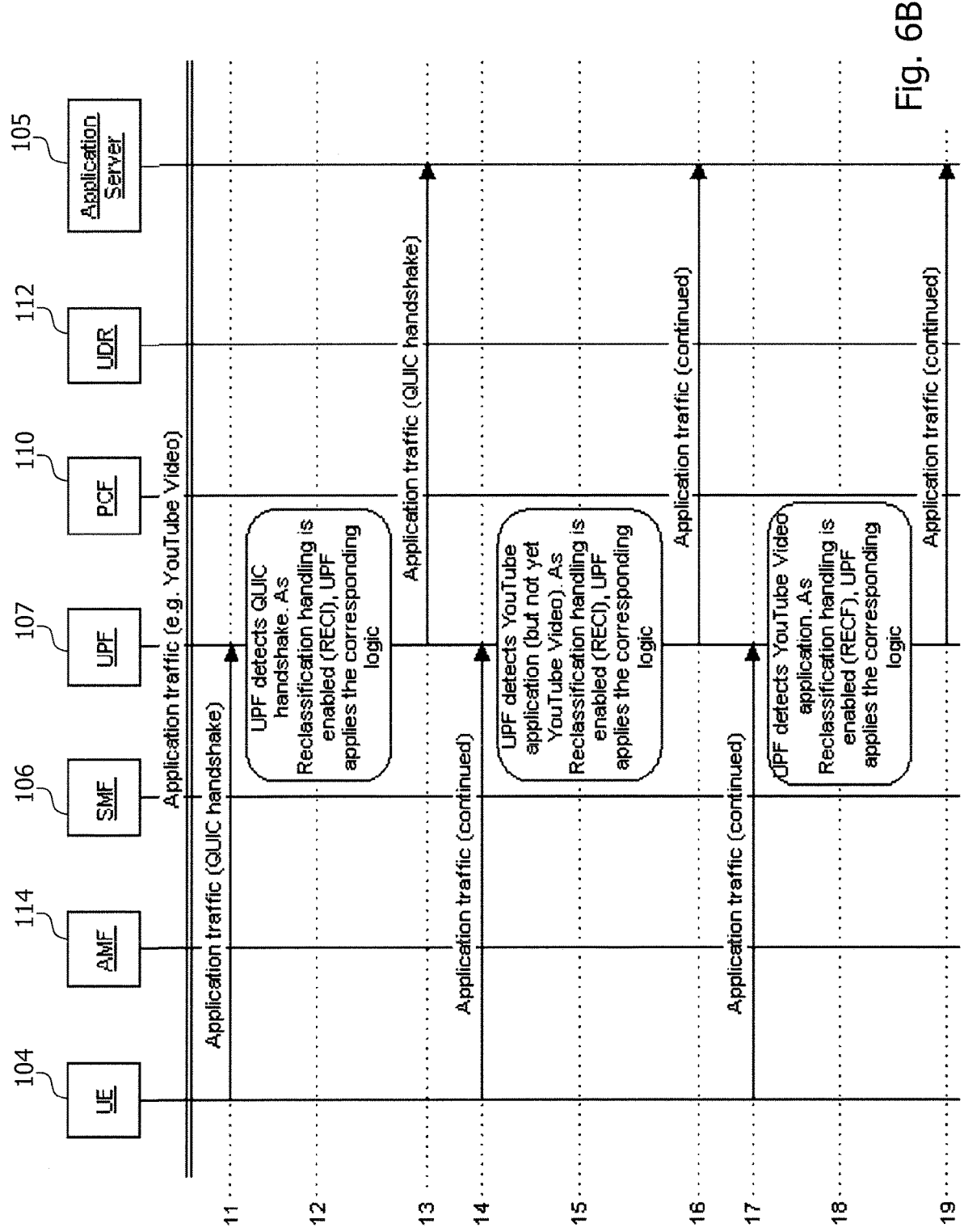

In a transitory phase indicated by steps 11) to 13) in FIG. 6B, UE 104 starts transmitting application traffic pertaining to YouTube video application services and a connection will be set up with the associated application server 105. In the transitory phase, UE 104 cannot yet determine the actual application services (i.e., YouTube video) for which the connection is eventually to be used during "regular" operation later on.

Assuming that QUIC is used as the transport protocol, the application traffic will initially comprise a QUIC handshake procedure (i.e., QUIC Client Hello and QUIC Server Hello messages). The QUIC handshake procedure will be detected by UPF 106 in accordance with step 412 in FIG. 4B. As such, UPF 106 will determine that the corresponding data packets match PDR 910 (or another PDR defined for default traffic). This determination corresponds to step 414 in FIG. 4B.

As the re-classification handling functionality is enabled at UPF 106 for this PDU session and for this PDR 910 (which has RECI bit set), certain actions will be applied by UPF 106 (see step 416 in FIG. 4B). If there is a URR linked to the matched PDR and the Measurement Method IE is set to volume, the volume of this data packet will not be accumulated (and reported) yet due to the "intermediate" nature. However, one or more other actions (mainly QER and FAR) will be applied and, if the final action is to forward the data packet, then UPF 106 will store locally:

the volume of the data packet;
a data packet flow identifier of the data flow comprising the data packet (e.g., the 5-tuple for the data flow);
the URR linked to the PDR matched; and
an identifier of the final PDR, i.e., the one included in octets 6 and 7 of the Reclassification IE illustrated in FIG. 8 (here: the identifiers of PDRs 902 and 904, see FIG. 9).

After the QUIC handshake is finished, UPF 106 will have internally stored on a per data packet flow identifier (e.g., per 5-tuple) basis:

the uplink accumulated volume, the URR identifier for the (uplink) PDR matched and the URR identifier for the (final) PDR; and
the downlink accumulated volume, the URR identifier for the (downlink) PDR matched and the URR identifier for the (final) PDR.

After the QUIC handshake, UE 104 continues sending application traffic in steps 14) to 16). The application traffic will now consist of YouTube video data packets. As indicated above, UPF 106 has to analyze a significant amount of data packets to properly identify specific (e.g., video or browsing) components in a certain application service, such as YouTube video in accordance with PDR 902. Until that proper identification happens (e.g., at data packet 100), all the intermediate data packets (e.g., from data packet 3 to data packet 99) may match in an extension of the transitory phase another PDR (e.g., the PDR 906 relating to generic YouTube application traffic). As the re-classification handling functionality is enabled at UPF 106 for this PDU session and for this PDR 906 (which has RECI bit set), certain actions associated with PDR 906 will be performed. For example, if there is a URR linked to the matched PDR 906 and the Measurement Method IE is set to volume, the volume of this packet will not be accumulated (and reported) yet in this URR. Moreover, other actions (mainly, QER and FAR) will be applied and, if the final action is to forward the data packet, then UPF 106 will store locally:

the volume of the data packet;
a data packet flow identifier of the data flow comprising the data packet (e.g., the 5-tuple for the data flow);
the URR linked to the PDR matched; and
an identifier of the final PDR, i.e., the one included in octets 6 and 7 of the Reclassification IE illustrated in FIG. 8 (here: the identifier of PDR 902, see FIG. 9).

During this phase UPF 106 will have internally stored on a per data packet flow identifier (e.g., per 5-tuple) basis:

the uplink accumulated volume, the URR identifier for the (uplink) PDR matched and the URR identifier for the (final) PDR; and
the downlink accumulated volume, the URR identifier for the (downlink) PDR matched and the URR identifier for the (final) PDR.

In steps 17 to 20), UE 104 will continue sending YouTube video data packets. In this case, after analyzing a certain number of data packets, for example after 99 data packets, UPF 106 determines that the data packet flow corresponds to a video component of the YouTube application service and consequently matches with the corresponding PDR 902 (e.g., starting at data packet 100). As the re-classification handling functionality is enabled at UPF 106 for this PDU session and for this PDR 902 (which has RECF bit set), the following actions will be performed by UPF 106:

Check if there is a URR associated with the matched PDR 902 with Measurement Method IE set to volume.
If above is fulfilled, check if UPF 106 has internally stored any previously uplink or downlink accumulated volume for this data packet flow (e.g., as identified by its 5-tuple).
If above is fulfilled, check if the (final) PDR stored for this previously accumulated volume (in the example: PDR 902 as stored for previously matched PDRs 910 and 906) is the same as the PDR matched (in the example: PDR 902 for the YouTube video traffic).
If above is fulfilled, the stored volume(s) (here: for PDRs 910) and 906) will be accumulated to the volume of the newly received data packet and, optionally, later data packets (that matched PDR 902). The totally accumulated volumes will be reported according to the URR associated with the final PDR (i.e., PDR 902) matched. UPF 106 will then remove internally the stored information for the relevant data packet flow so that the previously accumulated volumes will not be considered again.

On the other hand, if the matched final PDR has not Reclassification IF, UPF 106 will not accumulate the uplink and downlink stored volume to the volume of the uplink and downlink packets, but UPF 106 will instead:

Report the stored volumes in accordance with the URRs associated with the PDRs 906, 910 which were previously matched (these URRs are stored locally in the UPF 106 on a per data packet flow/per 5-tuple basis).
After that, UPF 106 will remove the internally stored information for the relevant data packet flow so these volumes will not be considered again.

In steps 23) and 24), UPF 106 will trigger a PFCP Session Report Request message to report (in accordance with the URR associated with the "final" PDR 902) the measured and, optionally accumulated, volumes accordingly.

In the embodiment discussed above with reference to FIGS. 6A to 6C, the 3GPP PFCP protocol is thus in particular extended with the Reclassification IE in the Create PDR IE or Update PDR IE. This permits SMF 107 to request from UPF 106 data packet flow re-classification on a per PDR basis. The approach presented in the above embodiments can be applied to different scenarios, such as:

Re-classification handling on a per PDU session (e.g., per subscriber) and on a per application service basis. This is the most granular scenario and the one described above with reference to FIGS. 6A to 6C, see step 7) in FIG. 6A. The subscriber profile in UDR 112 permits to request data packet flow re-classification for the particular subscriber associated with UE 104 but not for others.

Re-classification handling on a per application service basis (applied to any PDU session and, thus, to any subscriber).

Reclassification handling on a global basis (applied to any PDU session and to any application without differentiating, e.g., Netflix and YouTube application services as in FIG. 9).

Figure 6C:
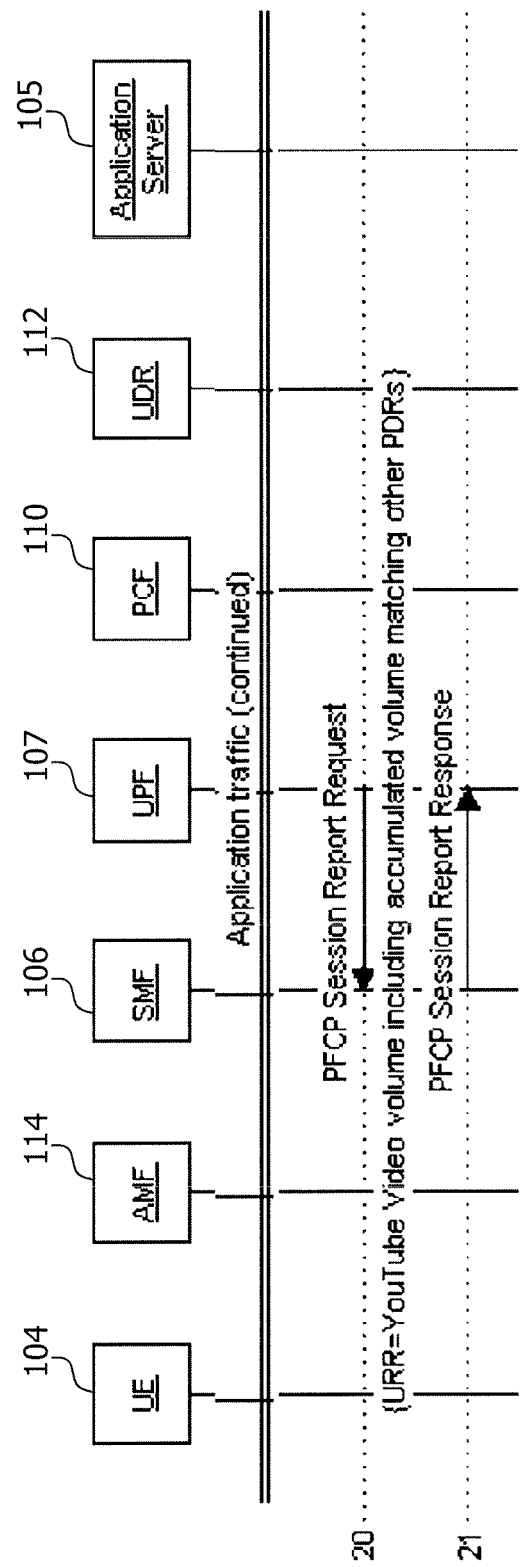

In a variant not shown in FIGS. 6A to 6C, and to avoid deferring the URR-based reporting of volume or other measurements, it is possible to indicate a new event (e.g., FLOW_RECLASSIFICATION) that will be sent from UPF 106 to SMF 107 when a data packet flow is being re-classified into a different PDR. This new event will allow sending a reporting request (e.g., a URR) by the SMF 107 to the UPF 106, which may respond with a message which will include the previously reported volume for that data packet flow, optionally on a per-matched PDR basis. Also the matched PDR may be indicated per associated measured volume.

Figure 5:
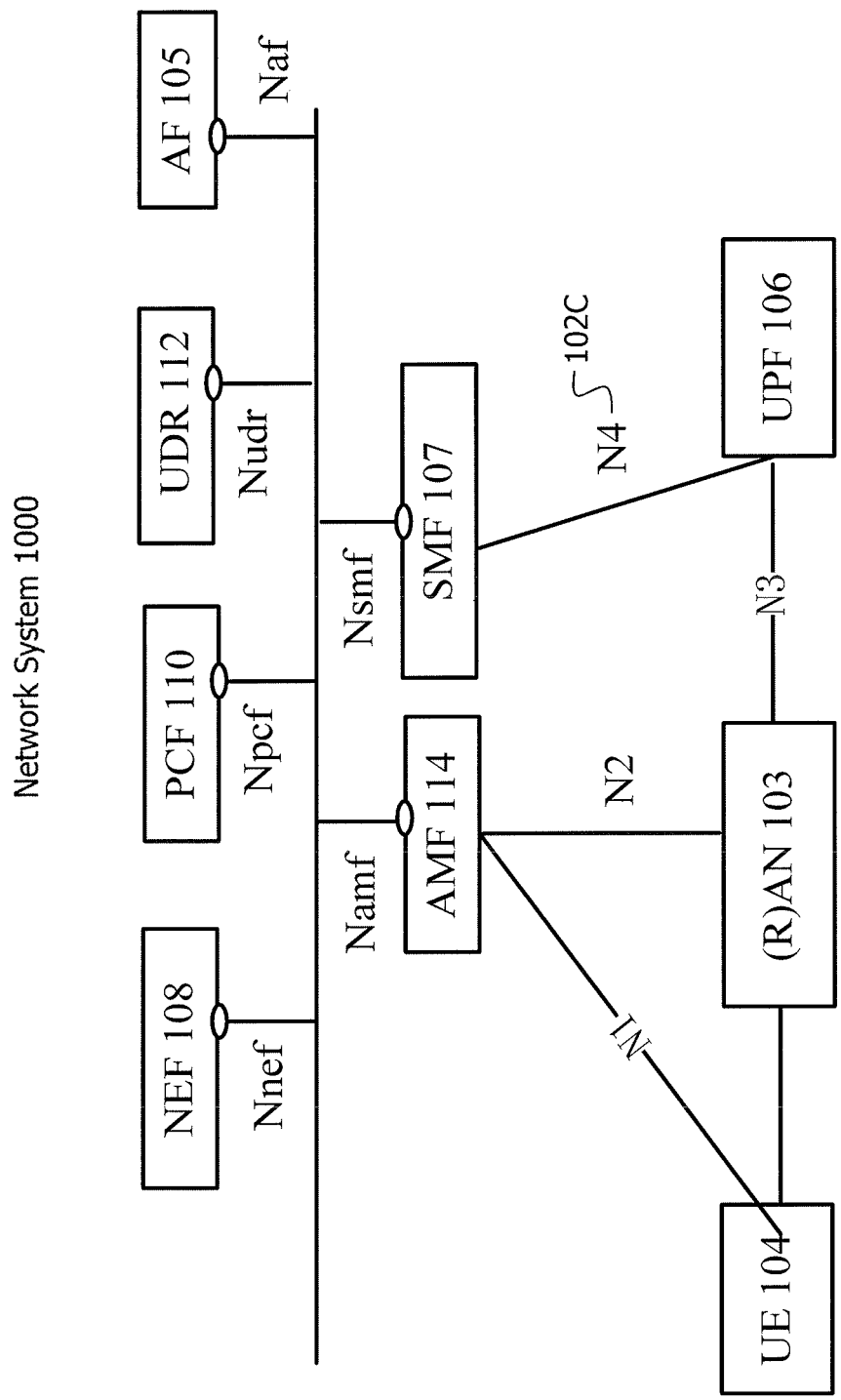
FIG. 5 is a diagram illustrating an exemplary 5G network architecture that can form the basis of embodiments of the present disclosure.

Evidently, the technique presented herein doe not only apply to a 5G network architecture as illustrated in FIG. 5. Rather, the same mechanisms can be applied to a 4G network architecture when replacing PCF 110 by a policy and charging rules (PCRF) entity, SMF 107 by a packet data network gateway control plane (PGW-C) entity or a traffic detection function control plane (TDF-C) entity, and UPF 107 by a packet data network gateway user plane (PGW-U) entity or a traffic detection function user plane (TDF-U) entity.

In some realizations, the technique presented herein allows network operators to properly report or charge traffic pertaining to a certain data packet flow into the right PDR (e.g., application service) in the case of 4G/5G core networks supporting CUPS. To this end, it allows, for example, UPF 106 to notify SMF 107 when traffic of a certain data packet flow is re-classified into a different PDR.

It will be appreciated that the present disclosure has been described with reference to exemplary embodiments that may be varied in many aspects. As such, the present invention is only limited by the claims that follow.

The invention claimed is:

1. A device for dynamically classifying and re-classifying a data packet flow on a user plane of a core network domain, wherein the device is configured to classify and re-classify the data packet flow using packet detection rules, PDRs, and wherein each PDR is associated with at least one action to be applied to data packets matching the PDR, the device being configured to
receive one or more first data packets of a data packet flow;
determine that the received one or more first data packets match a first PDR to classify the data packet flow according to the first PDR;
trigger application of at least one first action associated with the first PDR to the one or more first packets;
receive one or more second data packets of the data packet flow, wherein the one or more second data packets are received after the one or more first data packets;
determine that the received one or more second data packets match a second PDR to re-classify the data packet flow according to the second PDR, wherein the second PDR is different from the first PDR;
trigger application of at least one second action associated with the second PDR to the one or more second data packets; and
receive a third instruction selectively disabling reporting of at least one measurement performed for the one or more first data packets matching the first PDR at least until it is determined that the second PDR is matched by the one or more second data packets.

2. The device of claim 1,
wherein the data packet flow has been established for transmitting application data via the core network domain;
wherein the one or more first data packets are received preceding transmission of the application data; and
wherein the one or more second data packets contain the application data.

3. The device of claim 1, configured to
send a re-classification indication which indicates that the packet data flow has been re-classified.

4. The device of claim 3, configured to
receive, in response to the re-classification indication, a reporting request, wherein the reporting request relates to at least one measurement pertaining to at least one of the one or more first data packets and the one or more second data packets.

5. The device of claim 1, configured to
transmit a measurement report that reports at least one measurement pertaining to both the one or more first data packets and the one or more second data packets.

6. The device of claim 1, configured to
receive a first instruction selectively enabling usage of the second PDR for re-classification purposes.

7. The device of claim 6, configured to
receive the corresponding at least one instruction in a second message pertaining to one of creation and modification of the second PDR at the device.

8. The device of claim 1, configured to
receive a second instruction selectively disabling usage of the second PDR for re-classification purposes.

9. The device of claim 1, configured to
receive a fourth instruction selectively enabling reporting of at least one measurement performed for the one or more first data packets.

10. The device of claim 9, configured to
unconditionally perform and report the at least one measurement for the one or more first data packets in accordance with the measurement instruction as long as the reporting is enabled.

11. The device of claim 1, configured to
receiving a measurement instruction defining how the at least one measurement for the one or more first data packets is to be at least one of performed and reported.

12. The device of claim 11, configured to
receive the measurement instruction in a first message pertaining to one of creation and modification of the first PDR at the device.

13. The device of claim 1, configured to
receive a notification associating the first PDR with the second PDR.

14. The device of claim 13, configured to
receive a first instruction selectively enabling usage of the second PDR for re-classification purposes;
receive the corresponding at least one instruction in a second message pertaining to one of creation and modification of the second PDR at the device; and
receive the notification together with the third instruction in the second message.

15. The device of claim 13, configured to
receive the notification in the second or a third message pertaining to one of creation and modification of the second PDR at the device.

16. The device of claim 1, configured to
send a capability report indicative of the device being capable of performing data packet flow re-classification.

17. A device for controlling dynamic classification and re-classification of a data packet flow on a user plane of a core network domain based on packet detection rules, PDRs, wherein each PDR is associated with at least one action to be applied to data packets matching the PDR, the device being configured to
transmit a first PDR to enable classification of a data packet flow according to the first PDR, wherein the first PDR is associated with at least one first action that is to be applied to one or more first packets matching the first PDR;
transmit a second PDR to enable re-classification of the classified data packet flow according to the second PDR, wherein the second PDR is different from the first PDR and associated with at least one second action that is to be applied to one or more second packets matching the second PDR, wherein the one or more second data packets follow the one or more first data packets; and
send an instruction selectively disabling reporting of at least one measurement performed for the one or more first data packets matching the first PDR at least until it is determined that the second PDR is matched by the one or more second data packets.

18. A method of dynamically classifying and re-classifying a data packet flow on a user plane of a core network domain using packet detection rules, PDRs, wherein each PDR is associated with at least one action to be applied to data packets matching the PDR, the method comprising
receiving one or more first data packets of a data packet flow;
determining that the received one or more first data packets match a first PDR to classify the data packet flow according to the first PDR;
triggering application of at least one first action associated with the first PDR to the one or more first packets;
receiving one or more second data packets of the data packet flow, wherein the one or more second data packets are received after the one or more first data packets;
determining that the received one or more second data packets match a second PDR to re-classify the data packet flow according to the second PDR, wherein the second PDR is different from the first PDR;
triggering application of at least one second action associated with the second PDR to the one or more second data packets; and
receiving an instruction selectively disabling reporting of at least one measurement performed for the one or more first data packets matching the first PDR at least until it is determined that the second PDR is matched by the one or more second data packets.

19. A method of controlling dynamic classification and re-classification of a data packet flow on a user plane of a core network domain based on packet detection rules, PDRs, wherein each PDR is associated with at least one action to be applied to data packets matching the PDR, the method comprising
transmitting a first PDR to enable classification of a data packet flow according to the first PDR, wherein the first PDR is associated with at least one first action that is to be applied to one or more first packets matching the first PDR;
transmitting a second PDR to enable re-classification of the classified data packet flow according to the second PDR, wherein the second PDR is different from the first PDR and associated with at least one second action that is to be applied to one or more second packets matching the second PDR, wherein the one or more second data packets follow the one or more first data packets;
sending an instruction selectively disabling reporting of at least one measurement performed for the one or more first data packets matching the first PDR at least until it is determined that the second PDR is matched by the one or more second data packets.

* * * * *